July 7, 1959

J. J. BARTOLAT 2,893,417

DISPENSER FOR LIQUID ADDITIVES TO WATER HOSES

Filed Feb. 8, 1957

INVENTOR.
Joseph J. Bartolat
BY
Patrick D. Beavers
ATTORNEY.

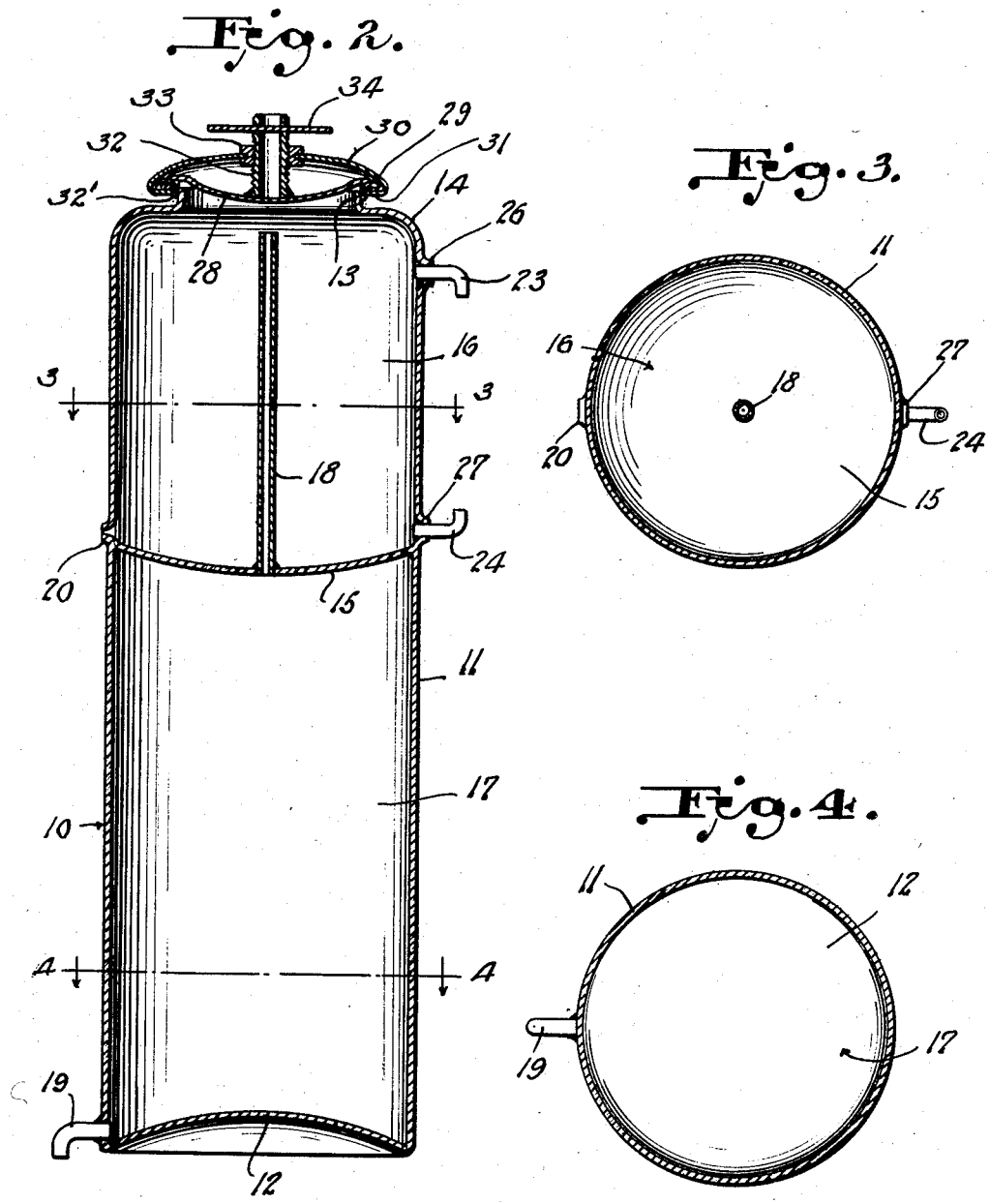

United States Patent Office 2,893,417
Patented July 7, 1959

2,893,417

DISPENSER FOR LIQUID ADDITIVES TO WATER HOSES

Joseph J. Bartolat, Tacoma, Wash.

Application February 8, 1957, Serial No. 639,134

1 Claim. (Cl. 137—205.5)

This invention relates to improvements in tanks and more particularly to a tank having a compartment therein to contain a fertilizer or insecticide and a compartment therein to contain water so that when water from a hose connected to the tank is mixed with the insecticide or fertilizer, a solution containing either may be discharged from the hose onto vegetation.

An object of the invention is to provide a mixing tank that is adapted to be connected to an ordinary garden hose so that the pressure of the flow of water in the garden hose will cause the insecticide or fertilizer in the mixing tank to be discharged onto the vegetation.

Another object of the invention is to provide a valve control for the tank for the discharge of the contents therefrom and a visual gauge to indicate the amount of liquid in the mixing tank.

With the above and other objects and advantages in view, the invention consists of the novel details of construction, arrangement and combination of parts more fully hereinafter described, claimed and illustrated in the accompanying drawings, in which:

Fig. 2 is a vertical sectional view of the mixing tank of Fig. 1;

Fig. 3 is a transverse sectional view of the mixing tank on the line 3—3 of Fig. 2; and Fig. 4 is a transverse sectional view of the mixing tank on the line 4—4 of Fig. 2.

Figure 1:
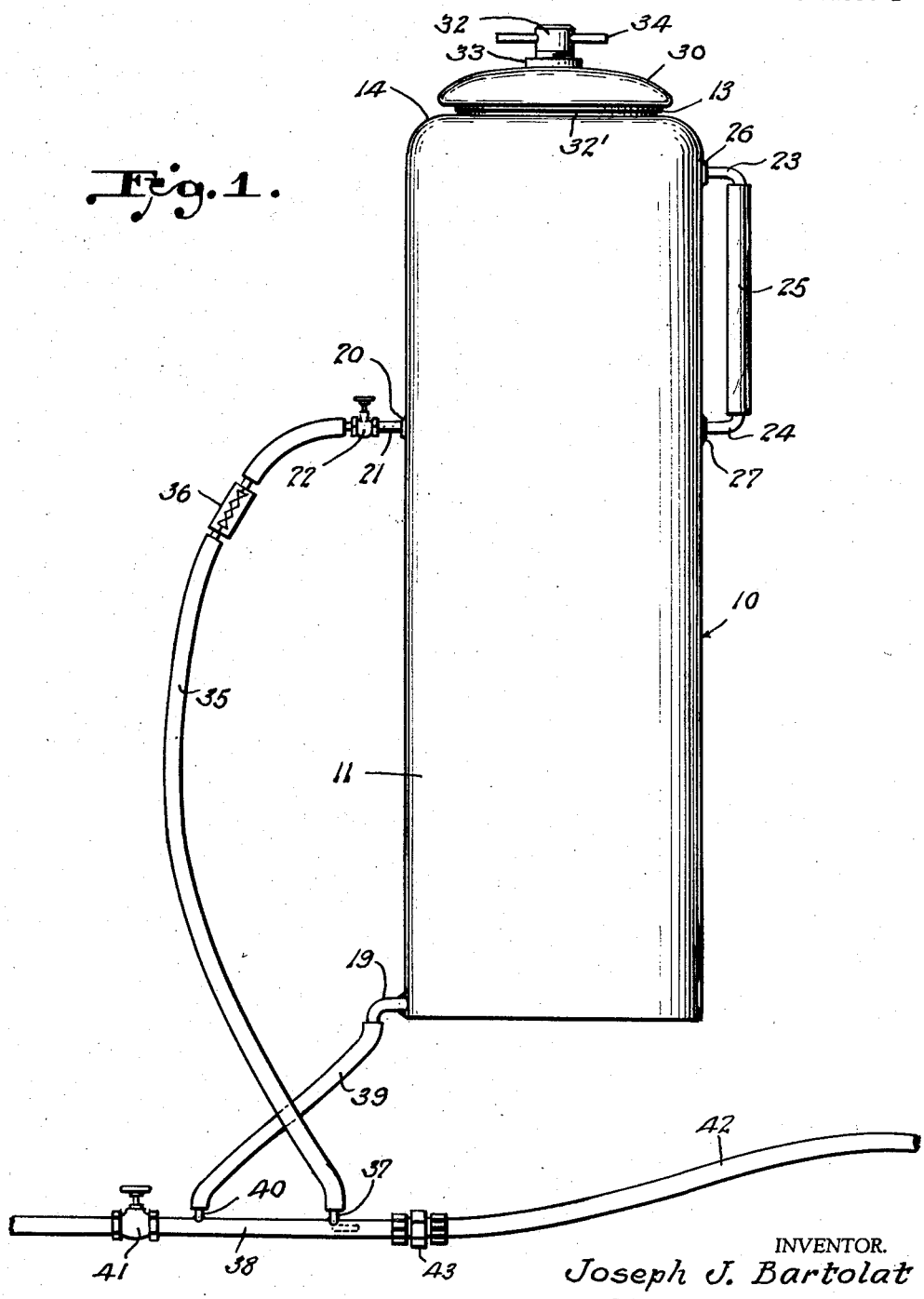
Fig. 1 is an elevational view of a mixing tank embodying the invention showing the manner in which it is attached to a garden hose.

Referring more in detail to the drawing, wherein like parts are designated by like reference numerals, the reference numeral 10 is used to generally designate a mixing tank embodying the invention.

The mixing tank 10 comprises an elongated cylindrical shaped body 11 having a concave bottom 12 and a filling neck 13 in a curved top 14.

A downwardly curved or flat partition 15 divides the body 11 into an upper compartment 16 and a lower compartment 17. The lower compartment 17 is twice the volume of the upper compartment 16.

Secured to the center of the partition 15 is a vertically disposed pressure equalizing tube 18 that communicates with the lower compartment 17, an elbow 19 communicating with the lower compartment 17 comprises a water inlet for the lower compartment 17.

An apertured boss 20 communicating with the upper compartment 16 provides a fluid outlet for the upper compartment 16, and a short pipe 21 having a valve 22 on the end thereof is connected to the boss 20.

An upper elbow 23 and a lower elbow 24 are secured to the body 11 in communication therewith and the elbows 23 and 24 are in vertical spaced alinement with each other to receive a sight tube 25. The elbow 23 is connected to an apertured boss 26 in the body 11 and the elbow 24 is connected to an apertured boss 27 in the body 11.

A concave lid 28, provided with an annular rubber gasket 29, engages the rim of the neck 13 and a curved cover 30 is positioned over the lid 28 and has a gripping edge 31 that engages a rubber gasket 32 on the neck 13 below the rim thereof. A tubular threaded post 32 is welded to the center of the lid 28 and extends through a circular nut 33 mounted in the center of the cover 30, a rod 34 extends through the post 32 transversely thereof outwardly of the cover 30 so that the lid 28 can be rotated into sealing engagement with the rim of the neck 13.

A hose 35 having a visual flow indicator 36 therein is connected at one end to the valve 22. The opposite end of the hose 35 being attached to an elbow 37 that is mounted in a water supply pipe 38, a hose 39 is connected at one end to the elbow 19 and at the opposite end to a second elbow 40 in the pipe 38. A valve 41 is interpolated in the pipe 38 to control the flow of water to a garden hose 42 that is connected by a coupling 43 to the free end of the pipe 38.

The principle of operation of the mixing tank 10 is as follows: A fluid such as an insecticide or fertilizer is placed in the upper compartment 16. The valve 22 is closed and the valve 41 is opened. Water from the pipe 38 is then fed into the lower compartment 17. As the water enters the lower compartment 17, pressure in the lower compartment 17 starts to build up and forms an air pocket which enters the upper compartment 16 by means of the tube 18. The water will continue to flow into the lower compartment 17 until the pressures are equal in both compartments and when it is equal to the water pressure in the pipe 38, it will stop. The water will never enter the upper compartment 16 unless all of the fluid in the upper compartment 16 has been discharged from the compartment 16. This is due to the fact that the lower compartment 17 is twice the size of the upper compartment 16.

When the water stops, the valve 22 is opened until the proper flow of the fluid from the upper compartment 16 has been determined by means of the flow indicator 36. The fluid will flow through the hose 35 to be mixed with the normal flow of water through the pipe 38.

When it is desired to shut off the tank 10, the valve 22 is first closed and the valve 41 is then closed so that the water in the lower compartment 17 will drain out of the pipe 38.

The mixing tank 10 is water tight and air tight and of sufficient strength to withstand the pressure developed in the tank. Soft safety plugs may be installed in the body 11 to prevent an explosion of the body 11 from excessive pressure.

There has thus been provided a simple and efficient mixing tank and it is believed that the structure and operation of the tank will be apparent to those skilled in the art. It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A device of the character described comprising a tank, a partition in said tank dividing the same into a relatively small upper compartment and a relatively large lower compartment, a vertical pipe extending from said partition to a point adjacent the upper end of said upper compartment, a water hose, a control valve in said water hose, a valved outlet at the lower end of said upper compartment, a pipe line interconnecting said valved outlet and said water hose subsequent in line of flow to said control valve, an inlet at the lower end of said lower compartment, and a pipe line interconnecting said last-mentioned inlet with said water hose likewise subsequent in line of flow to said control valve.

References Cited in the file of this patent

UNITED STATES PATENTS

| | | |
|---|---|---|
| 323,542 | Thomas | Aug. 4, 1885 |
| 575,932 | Nageldinger | Jan. 26, 1897 |
| 636,226 | Halvorsen | Oct. 31, 1899 |
| 1,032,879 | Carlton et al. | July 16, 1912 |

FOREIGN PATENTS

| | | |
|---|---|---|
| 739,073 | France | Oct. 24, 1932 |